United States Patent

De Rosset

[15] 3,665,046

[45] May 23, 1972

[54] SEPARATION OF PARA-XYLENE FROM MIXTURES OF C$_8$ AROMATICS UTILIZING CRYSTALLINE ALUMINOSITICATE ADSORBENTS

[72] Inventor: Armand J. De Rosset, Clarendon Hills, Ill.

[73] Assignee: Universal Oil Products Company, Des Plaines, Ill.

[22] Filed: Oct. 13, 1969

[21] Appl. No.: 865,994

[52] U.S. Cl. .......................................260/674 SA, 208/310
[51] Int. Cl. ..................................................C07c 7/12
[58] Field of Search ......................260/674, 674 SA; 208/310

[56] References Cited

UNITED STATES PATENTS

| | | | |
|---|---|---|---|
| 2,882,243 | 4/1959 | Milton | 252/455 |
| 3,114,782 | 12/1963 | Fleck et al. | 260/674 |
| 3,126,425 | 3/1964 | Eberly et al. | 260/674 |
| 3,130,007 | 4/1964 | Breck | 252/455 |
| 3,133,126 | 5/1964 | Fleck et al. | 260/674 |

*Primary Examiner*—Delbert E. Gantz
*Assistant Examiner*—C. E. Spresser
*Attorney*—James R. Hoatson, Jr. and Robert W. Erickson

[57] ABSTRACT

A process for the separation of an aromatic hydrocarbon from a mixture of aromatic isomers using a crystalline aluminosilicate adsorbent. A feed mixture comprising at least two aromatic-type hydrocarbons is passed through a bed of a faujasite structured adsorbent wherein one of the aromatics is preferentially adsorbed within the adsorbent. A subsequent desorption step is then used to desorb the selectively adsorbed feed component.

5 Claims, No Drawings

SEPARATION OF PARA-XYLENE FROM MIXTURES OF C AROMATICS UTILIZING CRYSTALLINE ALUMINOSITICATE ADSORBENTS

BACKGROUND OF THE INVENTION

1. Field of the Invention

The field of art to which the claimed invention pertains is hydrocarbon separation. More specifically, the claimed invention pertains to the separation of aromatic hydrocarbons incorporating an adsorbent which selectively retains a preselected aromatic hydrocarbon from a feed mixture. The selectively adsorbed aromatic component is recovered from the solid adsorbent through a desorption step which employs a desorbent material to effectively remove adsorbed material from the adsorbent.

2. Description of the Prior Art

It is well known in the separation art that certain crystalline aluminosilicate zeolites can be used to separate individual hydrocarbons from mixtures thereof. In many instances, a separation is effected by the difference in molecular size and structure of the components to be separated. I have found that in certain hydrocarbon separation applications, namely the separation of $C_8$ aromatic hydrocarbons into individual components that a crystalline aluminosilicate zeolite containing cetain cations can be employed to effectively separate the various $C_8$ aromatic isomers from each other in a predetermined manner. While the separation of the individual $C_8$ aromatic hydrocarbons is effected by the molecular sieve structure, it appears to me that the most important criterion which is used to effect separation is the placement of certain cations on the zeolite structure. In many instances where the Type X and Type Y structured crystalline aluminosilicate zeolites are used as adsorbents, the $C_8$ aromatic hydrocarbons including ethylbenzene, para-xylene, meta-xylene and ortho-xylene are all able to be adsorbed or retained by the adsorbent to a certain degree. The particular process of placing certain cations within the zeolite allows an enhanced chemisorption towards a selected isomer, thereby allowing a separation of one of the isomers from the others even though in effect all four isomers are capable of passing into the structure of the zeolite.

In adsorptive separation processes employing crystalline aluminosilicate zeolites as adsorbents, the separation of para-xylene from ortho-xylene and meta-xylene can be accomplished by using an adsorbent which is more acidic than para-xylene or an adsorbent which approaches the basic characteristics of the meta-xylene and ortho-xylene. In the former case, the more basic meta-xylene and ortho-xylene isomers will be preferentially adsorbed within the zeolite adsorbent leaving a para-xylene enriched external phase and a meta-xylene and ortho-xylene enriched adsorbed phase, while in the latter case, the para-xylene which is more acidic than the ortho-xylene or meta-xylene would be preferentially adsorbed by the basic adsorbent leaving an external phase enriched in meta-xylene and ortho-xylene and a para-xylene enriched adsorbed phase. The separation of the $C_8$ aromatic isomers becomes more involved when ethylbenzene is present together with the ortho-xylene, meta-xylene and para-xylene isomers. The ethylbenzene is considered to be the most acidic $C_8$ isomer and its presence during the adsorptive separation operations interfere with the ability of most adsorbents which base their separation on some sort of chemisorption phenomena to effectively separate the para-xylene from the meta-xylene or ortho-xylene or from ortho-xylene and meta-xylene isomers. Sodium and calcium forms of both the Type X and Type Y structured crystalline aluminosilicate zeolites selectively adsorbed meta-xylene and ortho-xylene from a mixture of ortho-xylene, meta-xylene and para-xylene, but when ethylbenzene is present with the three above-mentioned isomers, the adsorbent selectively retains para-xylene over the ethylbenzene. This gives an adsorbed phase rich in ortho-xylene and meta-xylene, but contaminated with para-xylene because of the para-xylene 's preferred retention when compared to ethylbenzene. While the prior art has found and disclosed that Type X and Type Y crystalline aluminosilicate structured zeolites which contain certain cations generally selected from the Group IA, and Group IIA metals can effect a preferential adsorption of a single component of the $C_8$ aromatic isomers without interference from the presence of ethylbenzene or any other of the xylene isomers. I have found that when employing the Type X and Type Y structured zeolites that effective separation can take place employing cations selected from the rare earth metals. The essential feature of my invention resides in allowing a rare earth Type X or Type Y structured zeolite to effectively and preferentially adsorb para-xylene when compared to the ortho-xylene, meta-xylene and ethylbenzene, or to preferentially separate other isomers from a mixture thereof.

SUMMARY OF THE INVENTION

It is an object of the present invention to provide an adsorptive separation process for the separation of a selected aromatic isomer from a mixture containing at least two other aromatic materials. It is another object of this invention to provide an adsorptive separation process employing a rare earth-containing Type X or Type Y zeolite adsorbent which selectively adsorbs one or more pre-selected aromatic isomers from a mixture of aromatic isomers.

In adsorptive separation processes, an important factor that is used to determine the ability of a particular adsorbent to separate components of a feed mixture is the selectivity of the adsorbent for one component as compared to another component. The selectivity B as used throughout this specification is defined as the ratio of two components of the adsorbed or retained phase over the ratio of the same two components in the unadsorbed phase measured at equilibrium conditions and is expressed in equation 1 below:

$$\text{Selectivity} = B_{x/y} = \frac{\left(\frac{x}{y}\right)_a}{\left(\frac{x}{y}\right)_u} \quad (1)$$

where $x$ and $y$ are the two components of the feed represented in volume percent and the subscripts $a$ and $u$ represent the adsorbed unadsorbed phases respectively. For a two component system, that is, where only two aromatic materials are to be passed over an adsorbent, the selectivity is easily calculable by taking the ratio of the volume percent of component $x$ and the volume percent of component $y$ adsorbed or present within the adsorbent over the ratio of the volume percents of the individually two components present in the feed stock. This ratio gives the selectivity. In instances where two or more components are in a feed stream, the only difference in measuring the selectivity is that a third component which is not to be considered in the measurement of selectivity is not included in the ratio in either the unadsorbed or adsorbed phase. The equilibrium conditions were determined when the feed passing over a bed of a selected adsorbent did not change in composition after contacting the bed of adsorbent, or in other words, there was no net transfer of material occurring between the unadsorbed and adsorbed phases when the selectivity of the two selected components was measured. In effect, this meant that the sieve had adsorbed to its fullest extent any components present in the feed stock and the feed stock passing out of the adsorbent had the same composition as the feed stock passing into the adsorbent bed.

As can be seen where the selectivity of the two components approaches unity, there is no preferential adsorption of one component by the adsorbent because the ratio of feed to components in the adsorbed and unadsorbed phases are equal. As the value of $B$ becomes greater than unity, there is a preferential selectivity by the adsorbent of one of the two components. When comparing a selectivity of component $x$ over component $y$, a $B$ larger than unity indicates preferential adsorption of component $x$ within the adsorbent while a $B$ less than unity would indicate that component $y$ is preferentially adsorbed by the adsorbent.

Starting materials which can be used in producing the adsorbent disclosed to be used in the process of this invention include faujasite-type crystalline aluminosilicate zeolites. Faujasite-type aluminosilicates generally include the group of truncated octahedra with access to the inner cavity allowed by four 12-sided windows, each having a diameter of about 9 Angstroms. The inner cavity has a diameter of about 11 Angstroms. Both the Type X and Type Y zeolites are members of the faujasite group and have the same essential crystalline structure. A general description of the faujasite group generally includes that the aluminosilicate cage structure contain silica and alumina tetrahedra which are intimately connected with each other in an open three-dimensional crystalline network. The tetrahedra are cross-linked by the sharing of oxygen atoms by the aluminum and silicon atoms. The spaces between the tetrahedra are generally occupied by water molecules prior to the dehydration of the zeolite. Subsequent partial or total dehydration of the zeolite results in the crystal structure being interlaced with channels of molecular type dimensions. The crystalline aluminosilicates of the faujasite group may be represented by the general formula presented in equation 2 below: $M_{2/n}O:Al_2O_3:wSiO_2:yH_2O$ (2) where $M$ is a cation which balances the electrovalence of tetrahedra, n represents the valence of that cation, $w$ represents the moles of SiO$_2$ and y represents the moles of water. Generally, the cations which are present in the above general faujasite group may be any one of the number of cations which can be ion-exchanged onto the zeolite.

In the faujasite group, the exact species of the faujasite is generally determined by its particular silica to alumina ratio and the pore dimensions of the cage structure. The two basic species of the faujasite group commonly used in catalysis and adsorptive separation processes are generally labeled the Type X and Type Y zeolites, with their basic differences being in their varying silicon to aluminum ratios.

The zeolite Type X may be represented in terms of the mole ratios of oxides as represented in the following equation 3:

$$0.9\pm0.2M_{2/n}:Al_2O_3:2.5\pm0.5SiO_2:yH_2O \quad (3)$$

where $M$ represents at least one cation having a valence generally of not more than 3, $n$ represents a valence of $n$ and $y$ is a value up to about 8, depending on the identity of $M$ and the degree of dehydration of the crystalline structure. Zeolite Type X is described in U.S. Pat. No. 2,882,244.

The Type Y zeolite, may be represented in terms of the mole ratio of oxides as shown in equation 4 below:

$$0.9\pm0.2M_{2/n}:Al_{23}:wSiO_2:yH_2O \quad (4)$$

where $M$ represents a cation having a charge of generally 3 or less and n represents the valence of $M$, y is any value up to about 9 and $w$ is any value greater than about 3 and up to about 6.5. Zeolite Type Y is generally described in U.S. Pat. No. 3,130,007.

For the Type X and Type Y zeolites, the cationic exchange sites are represented by $M$ in equations 2, 3 and 4 above. Cationic exchange methods are generally known to those familiar with the field of zeolite production and are generally performed by contacting a selected zeolite with an aqueous solution of a soluble salt of the cation or cations desired to be exchanged on the sieve. The desired degree of cationic exchange is allowed to take place before the sieves are removed from the aqueous solution, washed and dried to the desired water content. It is contemplated that the cationic exchange may take place using individual solutions of the desired cations to be placed on the molecular sieve or exchange solutions containing mixtures of the cations desired to be exchanged onto the crystalline aluminosilicate zeolite.

The term Type X or Type Y structured zeolite shall mean, in this specification, the crystalline structures previously described and which may contain, in addition to a rare earth metal, cations selected from the alkali or alkaline earth metals. The cations which are placed on the Type X and Type Y structured zeolites or faujasites which are used as adsorbents in the process of this invention are selected from the rare earth metals. The rare earth metals or rare earth elements are generally referred to also in the alternative as the rare earth series or the lanthanide series and include a group of elements with the atomic numbers of 57 through and including 71. Specific listing of the rare earth metals include lanthanum, cerium, praseodymium, neodymium, promethium, samarium, europium, gadolinium, terbium, dysprosium, holmium, erbium, thulium, ytterbium and lutetium. I have found that by employing the rare earth metals that an adsorbent is produced which allows effective separation of one $C_8$ aromatic from a mixture thereof and in particular the selective retention of para-xylene from a stream containing other or all of the $C_8$ aromatic isomers.

In separating the para-xylene isomer in the process of this invention, a bed of rare earth-exchanged adsorbent is contacted with a feed mixture, the para-xylene is preferentially adsorbed or retained by the adsorbent, the unadsorbed or raffinate mixture is removed from the adsorbent bed, and the retained para-xylene is removed from the adsorbent. The adsorbent can be contained in a single chamber where, through programmed flow into and out of the chamber, a separation of a para-xylene stream is effected. Swing bed operational techniques where a series of adsorbent chambers are available or simulated moving bed countercurrent operations generally similar in some respects to the pattern of operations are disclosed in U.S. Pat. No. 2,985,589. In the latter method of operation, the selection of a suitable desorbent requires that it be capable of readily displacing adsorbed para-xylene from the adsorbent and also that the para-xylene in the feed mixture be able to displace adsorbed desorbent from a previous desorption step. This requires that a desorbent, used in a simulated moving bed process where there is a continuous transfer of para-xylene and desorbent into and out of the adsorbent, have a B, when compared to para-xylene, close to unity and preferably slightly less than unity since mass action effects are used to desorb adsorbed para-xylene with the desorbent when collecting para-xylene product and mass action effects are also used to desorb adsorbed desorbent with para-xylene when the para-xylene is being adsorbed on the adsorbent.

The desorbent used in the process of this invention should be a material that is separable from the mixture that is fed to the solid adsorbent. In desorbing the preferentially adsorbed component of the feed, both desorbent and the desorbed feed component are removed from the adsorbent bed in admixture, and without a method of separation of these two materials, the purity of the selectively adsorbed component of the feed would not be very high. Therefore, it is contemplated that a desorbent that is of a different boiling range than the feed mixture fed to the solid adsorbent be used in this separation process. The use of a desorbent of a differing boiling range would allow fractionation or other separation methods to be used to separate the selectively adsorbed feed component as a relatively pure product stream and allow recovery of the desorbent for possible reuse in the process.

Desorbents which can be used in the process of this invention include benzene, toluene, ethers, alcohols, cyclic dienes and the ketones, all of which as preferred to have lower boiling points than paraxylene. Benzene and toluene are particularly preferred desorbents for use in the process of this invention. Gaseous materials such as nitrogen, hydrogen, methane, ethane, para-xylene. can also be used as desorbent materials.

Both liquid and vapor phase operations can be used in the process of this invention. The liquid phase operations are preferred because of the lower temperature requirements and slightly improved selectivities associated with the lower temperatures. Temperature ranges which can be used in adsorption of the preferred xylene isomer within the adsorbent include the range of from about 40° C. to about 300° C. Pressures preferred in the operation of this invention are included in the range of from about atmospheric to about 1,000 psig.

Desorption conditions include the same range of temperatures and pressures as used for adsorption. The desorption of the selectively adsorbed aromatic isomer may be effected at reduced pressures or elevated temperatures or both reduced pressures and elevated temperatures, in which case the desorbent would be used to strip the adsorbed component from the adsorbent.

Feed streams which can be used in the process of this invention comprise at least two components selected from the group of ortho-, meta-, para-xylene and ethylbenzene with possible inclusion of portions of straight and branched-chain paraffins, cyclo-paraffins and aromatics including benzene, toluene, naphthalenes, etc. It is preferred, however, to use feed streams having $C_8$ aromatic isomer concentrations of from about 50 to 100 volume percent of the total feed contacting the adsorbent bed.

In testing various adsorbents, the selectivity, as defined previously, was determined using apparatus and procedures as described below. The apparatus used to measure the selectivity of a particular adsorbent consisted of a chamber of approximately 40 cc. volume having inlet and outlet ports at opposite ends of the chamber. The chamber was contained within a temperature controlled heating means and in addition, pressure control equipment was used to operate the chamber at a constant predetermined pressure. Attached to the outlet line connected to the outlet of the chamber was a chromatograph which was used to analyze the effluent stream leaving the adsorbent chamber.

The following general procedures were used to determine the B for various adsorbents tested in the chamber. A feed mixture having a known composition was passed through the adsorbent chamber at a regulated pressure and temperature until the effluent composition flowing from the adsorbent chamber remained at a constant composition indicating that there was no net transfer between the adsorbed phase within the adsorbent and the unadsorbed or external phase surrounding the sorbent particles. A second mixture containing a hydrocarbon which was able to desorb the previously adsorbed component of the feed from the adsorbent was then passed through the adsorbent chamber. The chromatograph was used to monitor the unadsorbed or external phase and the material desorbed from within the adsorbent. Knowing the compositions of these two streams, the B for various components present in the feed stream could be determined.

The feed stream which was used to illustrate the operability of the adsorbent in the process of this invention consisting of equal quantities (5 volume percent each) of para-xylene, meta-xylene, ortho-xylene, ethylbenzene, and mixed diethylbenzene, with 2,2,4- trimethylpentane making up the remaining 75 volume percent of the feed. The feed stream was diluted to 25 volumetric percent $C_8$ aromatic isomers and 75 percent paraffin material in order to simplify the analytical procedures from measuring the effluent stream from the adsorbent chamber. The desorbent material employed consisted of approximately 74 volume percent of the iso-octane mixed with 25 volume percent of toluene. One percent of neo-hexane was also used in the desorbent as a tracer to determine the desorbent breakthrough in the effluent stream leaving the adsorbent chamber as measured by the chromatograph.

The adsorbent tested herein was originally a sodium form Type Y zeolite which had been essentially and totally potassium ion-exchanged prior to being exchanged for a second time with the rare earth metals. This particular type of adsorbent was used because of its availability for testing purposes. Direct rare earth ion-exchange of sodium form Type Y zeolites are believed to yield essentially the same type results and it is not an essential portion of this invention that the sieve which contains the rare earth metals be also contacted with a potassium salt solution. I have found that the rare earth metals when placed upon the Type Y zeolite exhibits selectivity for para-xylene when compared to the other $C_8$ aromatic isomers.

EXAMPLE

This example is intended to specifically demonstrate the feasibility of employing the process of my invention to separate various aromatic isomers and is not intended to be a limitation of the scope of this invention, but rather a specific illustration.

Approximately 40 cc. of a rare earth-exchanged potassium Type Y zeolite was loaded into the aforementioned adsorption chamber. The adsorption chamber was operated by alternately passing feed streams and desorbent streams into the adsorbent in a programmed manner while monitoring the effluent stream in an orderly manner to effectively analyze the quantity of quality of the materials which are adsorbed by the adsorbent during the adsorption cycle. The adsorption and desorption cycles were effected until reproducible data were available. The results of these tests are reproduced in Table I below, and indicate that in all instances, this particular rare earth-exchanged zeolite preferential for the adsorption of para-xylene when compared to the other $C_8$ aromatic isomers.

TABLE I

Rare Earth Exchanged Zeolite

| | |
|---|---|
| Capacity, cc/40 cc of zeolite | |
| Ethylbenzene | 1.20 |
| Para-Xylene | 1.81 |
| Ortho-Xylene | 0.96 |
| Meta-Xylene | 0.86 |
| Total $C_8$ Aromatic Capacity | 4.83 |
| Selectivity, B | |
| Para-Xylene/Ethylbenzene | 1.50 |
| Para-Xylene/Meta-Xylene | 2.10 |
| Para-Xylene/Ortho-Xylene | 1.88 |

X-ray analysis of the adsorbent tested in this example indicated that there was a distribution of four rare earth metals present on the adsorbent together with a sizeable portion of potassium. The reason that the various rare earth metals were present within the adsorbent was that in most instances the rare earth metals which are used for ion-exchange purposes whether it be for adsorbent preparation or catalytic preparation are generally mixed as it is in most cases easier to use the mixtures rather than the individual purified components. X-ray analysis of the sieve tested in this example is shown in Table II below.

TABLE II

Rare Earth Exchanged Zeolite

| | |
|---|---|
| Metals Analysis by X-Ray Analysis | |
| Potassium | 12.20 wt.% |
| Lanthanum | 2.55 |
| Cerium | 3.85 |
| Prasodymium | 0.06 |
| Neodymium | 0.93 |

Various other mixtures or individual elements or compounds of the rare earth metals may be used to effectively produce an adsorbent which will render separation, by a preferred selectivity of one $C_8$ aromatic, from a mixture of other $C_8$ aromatics. It is contemplated that the adsorbents used may vary from essentially total ion-exchanged adsorbents to those containing as little as 5 percent, when calculated on an equivalent basis, of a rare earth metal or mixture thereof. The potassium metal present in the adsorbent tested while effecting to a certain degree the selectivity of the adsorbent for para-xylene, the rare earth metals by themselves also impart selective character of an adsorbent to allow separation of a particular $C_8$ aromatic from its isomerate mixture.

PREFERRED EMBODIMENT

A preferred embodiment of this invention resides in a separation process employing a crystalline aluminosilicate zeolite which contains at least one rare earth metal for effective separation of a particular aromatic hydrocarbon from a feed stream containing a mixture of aromatic hydrocarbons. A more specific embodiment of this invention resides in employing a crystalline aluminosilicate zeolite adsorbent containing a rare earth metal for the separation of a selected $C_8$ aromatic isomer from a mixture containing two or more $C_8$ aromatic isomers.

I claim as my invention rare

1. A process for separating para-xylene from a feed mixture containing at least two components selected from the group consisting of para-xylene, meta-xylene, ortho-xylene and ethyl-benzene, which process employs a crystalline aluminosilicate adsorbent selected from the group consisting of Type X or Type Y structured zeolites containing a metal selected from the rare earth metals which process comprises
contacting the feed mixture with a mass of said adsorbent at adsorption conditions to effect the selective retention of para-xylene. by said adsorbent.

2. The process of claim 1 further characterized in that said adsorbent contains lanthanum.

3. The process of claim 1 further characterized in that said adsorbent contains cerium.

4. The process of claim 1 further characterized in that said adsorbent contains praseodymium.

5. The process of claim 1 further characterized in that said adsorbent contains neodymium.

* * * * *